United States Patent [19]
Criswell

[11] 3,841,045
[45] Oct. 15, 1974

[54] CURTAIN WALL GASKET SYSTEM

[76] Inventor: Homer C. Criswell, 2608 Black Oak Ln., Arlington, Tex. 76012

[22] Filed: Feb. 26, 1973

[21] Appl. No.: 335,470

[52] U.S. Cl............................ 52/395, 52/403, 52/461
[51] Int. Cl.............................................. E06b 3/62
[58] Field of Search ............ 52/208, 235, 403, 400, 52/309, 461

[56] References Cited
UNITED STATES PATENTS

| 3,256,641 | 6/1966 | Johnson | 52/309 X |
|---|---|---|---|
| 3,303,626 | 2/1967 | Brigham | 52/309 X |
| 3,309,122 | 3/1967 | Van Der Sluys et al. | 52/395 |
| 3,336,707 | 8/1967 | Horgan, Jr. | 52/235 X |

FOREIGN PATENTS OR APPLICATIONS 1,011,881 12/1965 Great Britain ....................... 52/461

Primary Examiner—Alfred C. Perham
Attorney, Agent, or Firm—Jack A. Kanz

[57] ABSTRACT

Disclosed is an interlocking glazing gasket and support mullion adapted to provide improved vertical and horizontal support for curtain wall panels. The mullion includes a cup-shaped flange partially surrounding the body of the gasket between the mullion and the panel to rigidly support the gasket.

5 Claims, 1 Drawing Figure

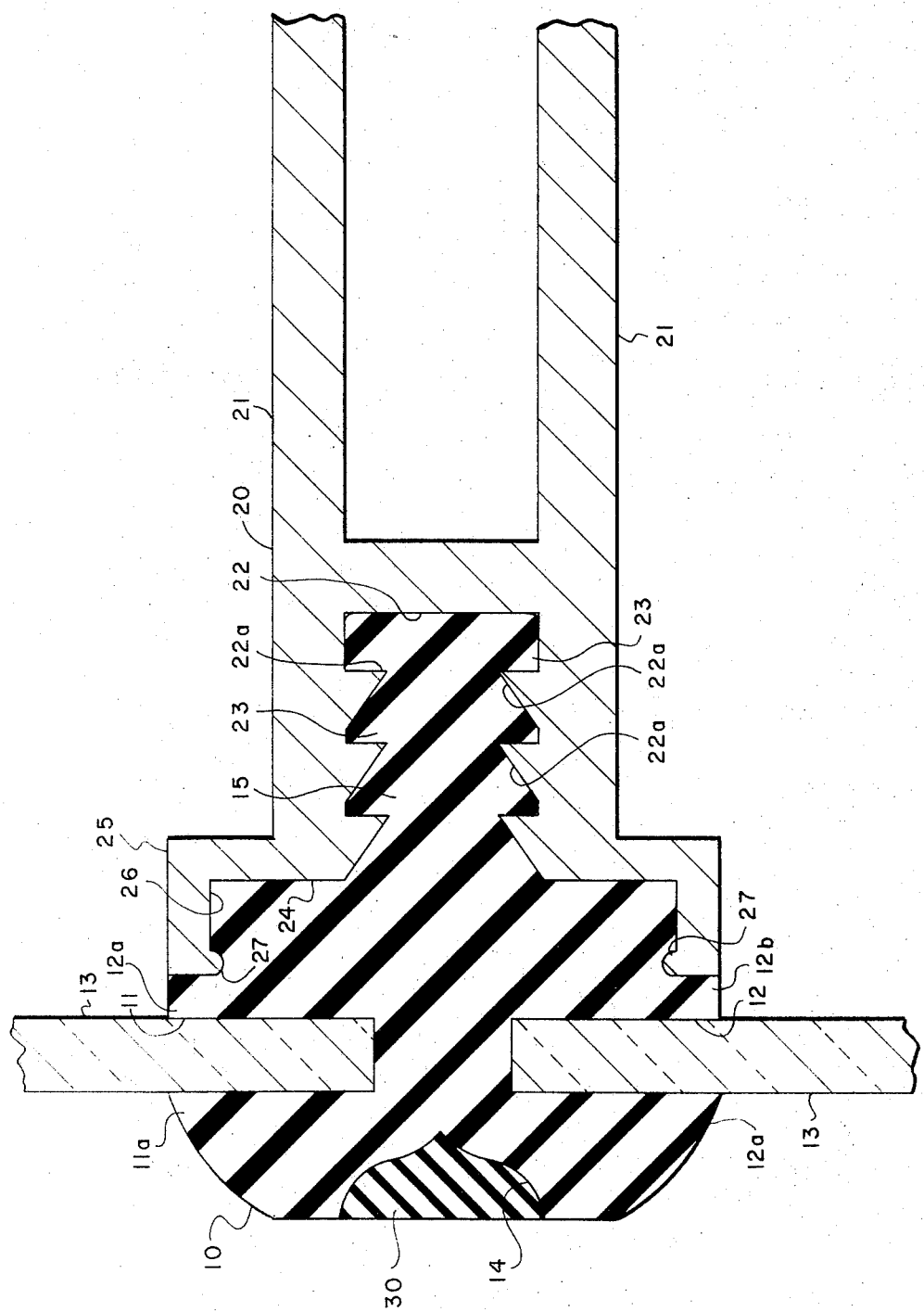

CURTAIN WALL GASKET SYSTEM

This invention relates to curtain wall construction. More particularly, it relates to an improved curtain wall system employing a novel glazing gasket and support mullion which provides improved horizontal and vertical support for the glazing panels.

Elastomeric gaskets are conventionally employed for retaining curtain wall panels within an open space defined by structural frameork. The wall usually includes separate panel framing elements attached to one face of the structure framework. The panels are ordinarily made of glass or other rigid materials. The framework is generally composed of a number of extruded metal members joined to form a single module having grooves defined therein for retaining an elastomeric gasket. The gasket contains grooves running along the length thereof for insertion of the curtain wall panel. Ordinarily the gasket strip includes a wedge-shaped member insertable in a wedge-receiving recess in the strip opposite the mounting support whereby the elastomeric material is crowded to cause the groove to engage the glass or other rigid sheets more securely. Such gasket strips have become widely used for external glazing to form non-structural curtain walls.

In conventional systems the gasket is usually T-shaped in cross section; the base of the T providing a tongue for insertion into a groove in the mullion supporting the gasket and the panel. The grooves for receiving the panels are normal to the tongue and the wedge is opposite the tongue. Accordingly, in conventional gasket systems, the weight of the panel is supported by only that portion of the gasket extending between vertically opposed panels and forming an extension of the retaining tongue.

It will be observed that where numerous panels are vertically disposed in the same curtain wall the weight of the panels will become cummulative. Therefore as the height of the wall increases, the vertical stress on the lower gaskets is increased, causing distortion and reducing the effectiveness of the gasket seal.

In accordance with the present invention a novel gasket and support mullion are provided which cooperate to provide both lateral and vertical support for the gasket and panel. The mullion includes a lip protruding radially from the face of the mullion and extending outwardly over at least a portion of the edge of the gasket body. External dimensions of the gasket are adapted to conform to the internal dimensions of the mullion and the gasket becomes interlocked therewith upon insertion within the mullion. The support portions of the mullion extend outwardly from the tongue receiving groove and toward the panel receiving groove to provide additional support for the glazing panel, thereby minimizing distortion of the gasket resulting from increased load.

By extending the mullion to partially surround the gasket, the gasket is more rigidly supported by the mullion and the weight of the glazing panels is transferred directly to the mullion through the gasket. Furthermore, the weight of the glazing panels is more evenly distributed over the supporting framework, therefore advantageously eliminating stress-induced distortion of the glazing panel and supporting gasket. Other features and advantages of the invention will become more readily understood when taken in connection with the appended claims and attached drawing in which the sole figure is a sectional view of the preferred embodiment of the gasket and support mullion of the invention taken through the vertical plane normal to the glazing panel.

As illustrated in the drawing the gasket strip comprises an elongated elastomeric body 10 having parallel grooves 11 and 12 diametrically opposed on opposite sides thereof and running the length of the elongated body 10. Grooves 11 and 12 are adapted to receive the glazing panels 13. The gasket includes wedge-receiving groove 14 running along the length of the elongated body parallel to grooves 11 and 12 but on the side of the body 10 substantially equidistant between oppositely disposed grooves 11 and 12.

The gasket body 10 is substantially T-shaped in cross-section having a tongue 15 extending laterally therefrom on the side opposite the wedge-receiving groove 14.

A support mullion 20 frames the open space in the structural framework to support the curtain wall. As viewed in the drawings the support mullion 20 is shown in vertical cross-section in a plane normal to curtain wall. It will be appreciated that the mullion is generally an elongated metal extrusion and identical mullions are used for vertical as well as horizontal framing elements. Therefore, a vertically extending mullion viewed in cross-section through the horizontal plane would appear the same as the figure illustrated.

The mullion 20 comprises a shank 21 adapted to be secured to the structural framework and includes a tongue receiving groove 22 on the side thereof extending toward the outer wall. The groove 22 preferably includes serrations 22a on the internal surface thereof.

In the embodiment illustrated the tongue 15 of the gasket includes matching protrusions 23 which mate with the serrations 22a to firmly secure the tongue within the retaining groove.

Conventional mullions are essentially rectangular in cross-section, the tongue receiving groove 22 terminating at the vertical face 24 with the head of the T-shaped gasket resting on the face 24.

In accordance with the present invention the mullion 20 is provided with a cupped flange 25 extending outwardly from the retaining groove in the face of the mullion. The flange 25 extends outwardly in a first direction parallel to the face 25 and parallel to the groove 22 to form an elongated channel 26 at the face of the mullion adjacent groove 22.

It will be observed that in the embodiment illustrated the cup-shaped flange 25 encloses substantially all of the head of the T-shaped gasket between the panels 13 and supporting mullion 20. Accordingly, the elastomeric material between the panel 13 and the mullion body is rigidly supported by the cup-shaped flange 25.

As illustrated in the drawing the portion of the T-shaped gasket between the panel 13 and the face 24 of the mullion is adapted to conform to the internal dimensions of the cup-shaped flange 25. In the preferred embodiment the flange 25 includes an inwardly projecting lip 27 and the head of the gasket contains a corresponding groove adapted to mate with the lip 27 to securely interlock the gasket within the channel 26.

As with conventional curtain wall gaskets, gasket 10 includes a wedge-receiving groove 14 adapted to receive wedge means 30. The wedge strip 30 is usually of less resilient material than the elastomeric body 10. Accordingly, insertion of the wedge strip 30 into groove 14 substantially strengthens the gasket body and urges the lips 11a and 12a toward panels 13 to securely seal the panels within the grooves 11 and 12.

It will be observed that since cup-shaped flange 25 terminates near the inner face of the panels 13 and is essentially embedded in the body of the gasket strip 10, the outer face of the cup-shaped flange 25 likewise serves to substantially reinforce the internal lips 11b and 12b of the groove 11 and 12, respectively, further aiding in securely sealing the panel 13 within the grooves 11 and 12. It will therefore be observed that the invention not only provides improved support for the gasket, but also improves sealing of the panels 13 within the grooves in the gasket.

The gasket and mullion system of the invention are installed in the same manner as conventional gasket systems. Due to the unique configuration of the interlocking gasket body and mullion, however, special insertion tools, similar to those commonly used for insertion of the wedge strip, may aid in installing the gasket in the mullion.

While the invention has been described with particular reference to a specific embodiment thereof, it is to be understood that the form of the invention shown and described in detail is to be taken as the preferred embodiment thereof, and that various changes and modifications may be resorted to without departing from the spirit and scope of the invention as defined by the appended claims.

What is claimed is:

1. Curtain wall gasket and support system comprising:
   a. a support mullion having a tongue-receiving groove extending parallel to one vertical face thereof adapted to receive the tongue portion of an elastomeric gasket and further including flange means extending from the outer edge of said vertical face defining an expanded channel adjacent and parallel to said tongue-receiving groove,
   b. gasket means comprising an elongated elastomeric body substantially T-shaped in cross-section, the base of said T forming a tongue portion mating with said tongue-receiving groove, the head portion of said T-shaped body having opposed grooves running along the length thereof and disposed normal to said tongue, the external surface of the portion of said T-shaped body between said oposed grooves and said tongue conforming to the internal dimensions of said channel, said body further including a wedge-receiving groove along the face thereof opposite said tongue, and
   c. wedge means mating with said wedge-receiving groove.

2. Curtain wall gasket and support system as defined in claim 1 wherein said flange means includes a lip extending inwardly toward said channel and said portion of said T-shaped body between said opposed grooves and said tongue includes recesses adapted to mate with said lip.

3. Curtain wall gasket and support system as defined in claim 1 wherein said tongue-receiving groove contains serrations on the internal surface thereof and said tongue means includes protrusions adapted to mate with said serrations.

4. Curtain wall gasket and support system as defined in claim 2 wherein said lip is embedded within said recesses and urges the lip of the adjacent groove against a glazing panel inserted therein.

5. Curtain wall gasket and support system comprising:
   a. a support mullion having a tongue-receiving groove extending along one vertical face thereof adapted to receive the tongue portion of an elastomeric gasket, said support mullion having a cupped flange extending outwardly from said tongue-receiving groove along said one vertical face,
   b. an elastomeric gasket comprising an elongated body substantially T-shaped in cross-section, the base of said T forming a tongue portion mating with said tongue-receiving groove, the body portion of said gasket having oppositely disposed grooves running along the length thereof and disposed normal to said tongue, and having a wedge-receiving groove running along the face thereof opposite said tongue portion, and
   c. wedge means mating with said wedge receiving groove.

* * * * *